(12) United States Patent
Glaenzer et al.

(10) Patent No.: US 8,271,503 B2
(45) Date of Patent: Sep. 18, 2012

(54) AUTOMATIC MATCH TUNING

(75) Inventors: Helmut K. Glaenzer, Leimen (DE); Gunther Stuhec, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 232 days.

(21) Appl. No.: 12/796,192

(22) Filed: Jun. 8, 2010

(65) Prior Publication Data
US 2010/0250559 A1    Sep. 30, 2010

Related U.S. Application Data

(63) Continuation of application No. 10/856,694, filed on May 28, 2004, now abandoned.

(51) Int. Cl.
*G06F 17/30* (2006.01)
(52) U.S. Cl. .................. 707/749; 707/758
(58) Field of Classification Search .......... 707/748, 707/749, 758, 760, 807, 999.006, 999.001, 707/999.107
See application file for complete search history.

(56) References Cited

U.S. PATENT DOCUMENTS

| | | | |
|---|---|---|---|
| 6,269,368 B1 * | 7/2001 | Diamond | 1/1 |
| 6,618,223 B1 | 9/2003 | Chen et al. | |
| 6,618,727 B1 | 9/2003 | Wheeler et al. | |
| 6,826,568 B2 * | 11/2004 | Bernstein et al. | 707/749 |
| 6,947,933 B2 * | 9/2005 | Smolsky | 707/693 |
| 7,444,330 B2 * | 10/2008 | Bernstein et al. | 1/1 |
| 2003/0120651 A1 * | 6/2003 | Bernstein et al. | 707/6 |
| 2004/0158567 A1 | 8/2004 | Dettinger et al. | |
| 2005/0060345 A1 | 3/2005 | Doddington | |
| 2006/0253418 A1 * | 11/2006 | Charnock et al. | 707/1 |

OTHER PUBLICATIONS

R. Agarwal, "Scalable Integration of XML Schemas," National University of Singapore, Jan. 1, 2002.
S. Castano et al., "Conceptual Schema Analysis: Techniques and Applications," ACM Transactions on Database Systems, vol. 23, No. 3, Sep. 3, 1998.
Hong-Hai Do et al., "COMA-A System for Flexible Combination of Schema Matching Approaches," Proceedings of the 28th International Conference on Very Large Databases, Aug. 2002.
E. Rahm et al., "A Survey of Approaches to Automatic Schema Matching," 2001, The VLBD Journal 10, pp. 334-350.
T. Milo et al., "Using Schema Matching to Simplify Heterogeneous Data Translation," Proceedings of the 24rd International Conference on Very Large Data Bases, 1998 pp. 1-21.

* cited by examiner

*Primary Examiner* — Leslie Wong
(74) *Attorney, Agent, or Firm* — Fish & Richardson P.C.

(57) ABSTRACT

Methods and apparatus, including computer program products, for identifying matches between disparate schemas calculates a degree of similarity between elements of two schemas using each of multiple matching processes. The calculated degrees of similarity are combined using a first weighting vector to produce first combined degrees of similarity. The first weighting vector includes multiple weighting coefficients and each weighting coefficient corresponds to one of the matching processes. The weighting coefficients are tuned using information relating to a predicted degree of matching accuracy associated with the first weighting vector.

18 Claims, 4 Drawing Sheets

AUTOMATIC MATCH TUNING

CROSS-REFERENCE TO RELATED APPLICATIONS

This application is a continuation of U.S. application Ser. No. 10/856,694, filed on May 28, 2004, the disclosure of which is expressly incorporated herein by reference in its entirety.

BACKGROUND

The present invention relates to data processing by digital computer, and more particularly to mapping elements between disparate schemas.

Integration of applications in an enterprise can lead to more efficient operations. Enterprise application integration can require significant effort when migrating from disparate legacy applications to a more integrated framework. Enterprise application integration can be performed using a message exchange procedure, in which messages are exchanged between different data sets. Application data is typically organized according to the type of application or applications with which the data is designed to operate. As a result, the organization or structure of the data can be highly specialized. The messages used for enterprise application integration are generally structured sets of data in a well-defined syntax. The structure of the data can be referred to as its schema. Countless different schemas and/or schema domains (e.g., SQL DDL, XML-based dialects (such as xCBL), OWL, RDF, ODMG, SAP-IDoc, EDI, UBL, etc.) exist. Many different integration scenarios (e.g., business process integration, enterprise application integration, and master data management) require schema matching, in which a mapping between the elements of two schemas is produced. Schema matching can also be important in data translation applications (e.g., where data from a first database is migrated into a second database for use with a different application).

Existing techniques for schema matching primarily rely upon manual mapping of elements from one schema to another. Some approaches exist, however, for partially automating the schema matching process using simple algorithms for field name or database structure matching or using machine learning technologies. Some approaches combine the criteria of different matching algorithms to produce a more complex matching technique (i.e., hybrid and composite matchers). Simple, hybrid, and composite matchers, however, are inflexible and tend to produce good results for some types of schemas while producing poor results for other types of schemas.

Techniques have also been proposed for building ontologies for different schema domains. By building an ontology, schemas can be classified by type, and different weights can be applied to different individual matchers based on the class or classes of the schemas to be matched. For example, schemas in a first classification may use a composite matcher that heavily weights the contribution of a field name matcher that is a component of the composite matcher, while schemas in a second classification may use a composite matcher that heavily weights the contribution of a structural matcher that is a component of the composite matcher. Such an approach may provide improved performance relative to conventional simple, hybrid, or composite matchers but only works for schema domains that have previously been associated with a particular class of schema domains.

SUMMARY OF THE INVENTION

The present invention provides methods and apparatus, including computer program products, that implement techniques for mapping schemas by tuning the relative contributions of different component matchers. The relative contributions (i.e., the weights) of different matchers can be tuned by optimizing a measure of ambiguity, which may be an algorithm that is based on a number of ambiguous matches, a number of unambiguous matches, and/or a number of impossible matches. In addition or as an alternative, the relative contributions of different matchers can be tuned by monitoring user interaction (e.g., user approvals and rejections of proposed matches) and using the user feedback to fine-tune the weights of the different matchers.

In one general aspect, the techniques feature calculating a degree of similarity between elements of two schemas using each of multiple matching processes and combining the calculated degrees of similarity using a first weighting vector to produce first combined degrees of similarity. The first weighting vector includes multiple weighting coefficients and each weighting coefficient corresponds to one of the matching processes. The weighting coefficients are tuned using information relating to a predicted degree of matching accuracy associated with the first weighting vector.

The invention can be implemented to include one or more of the following advantageous features. The calculated degrees of similarity are combined using each of multiple weighting vectors. Each weighting vector includes multiple weighting coefficients, and each weighting coefficient corresponds to one of the matching processes. The weighting coefficients are tuned by determining, using the combined degrees of similarity for each of the weighting vectors, a predicted degree of matching accuracy associated with each of the weighting vectors. A second weighting vector is selected to determine possible matches between the elements of the two schemas. The second weighting vector is selected based on a comparison of information relating to the respective predicted degrees of matching accuracy associated with the first weighting vector and the second weighting vector. Each predicted degree of matching accuracy is determined using a number of ambiguous matches, a number of unambiguous matches, and/or a number of impossible matches.

The weighting coefficients are tuned by identifying a set of possible matches between the elements of the two schemas based on the first combined degrees of similarity and receiving user feedback relating to a subset of the possible matches and using the user feedback to produce the information relating to a predicted degree of matching accuracy associated with the first weighting vector. The first weighting vector is then modified based on the information relating to the predicted degree of matching accuracy to produce a second weighting vector. The calculated degrees of similarity are combined using the second weighting vector to produce second combined degrees of similarity, and a modified set of possible matches between the elements of the two schemas is identified based on the second combined degrees of similarity.

The calculated degrees of similarity are combined by multiplying each calculated degree of similarity for each matching process by the corresponding weighting coefficient to obtain weighted degrees of similarity and summing the weighted degrees of similarity. A degree of similarity is calculated between multiple pairs of elements. Each pair of elements includes one element selected from a source schema and one element selected from a target schema.

Multiple different weighting vectors can be used. A level of ambiguity is determined for each weighting vector, and a particular weighting vector to determine possible matches between the elements of the two schemas is selected based on the level of ambiguity for each weighting vector. A level of ambiguity can be determined by determining a number of ambiguous matches, a number of unambiguous matches, and/or a number of impossible matches. For each weighting vector, a factor is calculated, and the particular weighting vector selected is based on a value of the factor for the particular weighting vector relative to values of the factors for other weighting vectors. The particular weighting vector selected can be a weighting vector having a factor that tends to indicate a relatively high number of ambiguous matches or a relatively high number of unambiguous matches. Alternatively, the particular weighting vector selected can be a weighting vector having a factor that tends to indicate a relatively low number of ambiguous matches and a relatively low number of impossible matches.

Unambiguous matches can be determined by identifying a maximum combined degree of similarity for the particular element, or identifying a combined degree of similarity for the particular element that exceeds a predetermined threshold and that exceeds all other combined degrees of similarity for the particular element by at least a predetermined amount. Ambiguous matches can be determined by identifying a combined degree of similarity for the particular element that exceeds a first threshold and is less than a second threshold or identifying a combined degree of similarity for the particular element that exceeds a predetermined threshold and that is within a predetermined range of other combined degrees of similarity for the particular element. Impossible matches can be identified by determining, for a particular element, that no combined degree of similarity for the particular element exceeds a predetermined minimum threshold. The matching processes can include schema-based criteria, content-based criteria, per-element criteria, structural criteria, linguistic criteria, and/or constraint-based criteria.

User feedback relating to possible matches can be used to modify a first weighting vector to produce a second weighting vector. The calculated degrees of similarity can then be combined using the second weighting vector to produce second combined degrees of similarity, and a modified set of possible matches between the elements of the two schemas can be identified based on the second combined degrees of similarity. The first weighting vector can be selected based on a context associated with the two schemas and/or a similarity of one or more of the schema to schema for which the first weighting vector was previously used.

The invention can be implemented to realize one or more of the following advantages. The invention can be used to provide enhanced matching performance, to improve the quality of matching, and/or, depending on the particular algorithms that are used, regulate the number and types of possible matches that are identified for manual review and approval. In addition to providing improved matching results for schemas that previously have been classified, the invention can also be used to provide enhanced matching results for unclassified schemas. In addition, the invention can be used to assist users with manual finishing touches because the system can provide some different mapping examples as suggestions to the user. In other words, the elements of disparate schemas may be mapped without detailed knowledge of the characteristics of the schemas. In this regard, the techniques provide generic data model matching (i.e., the techniques can perform matching independent of the data model). Furthermore, mapping can be performed automatically or at least semi-automatically. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
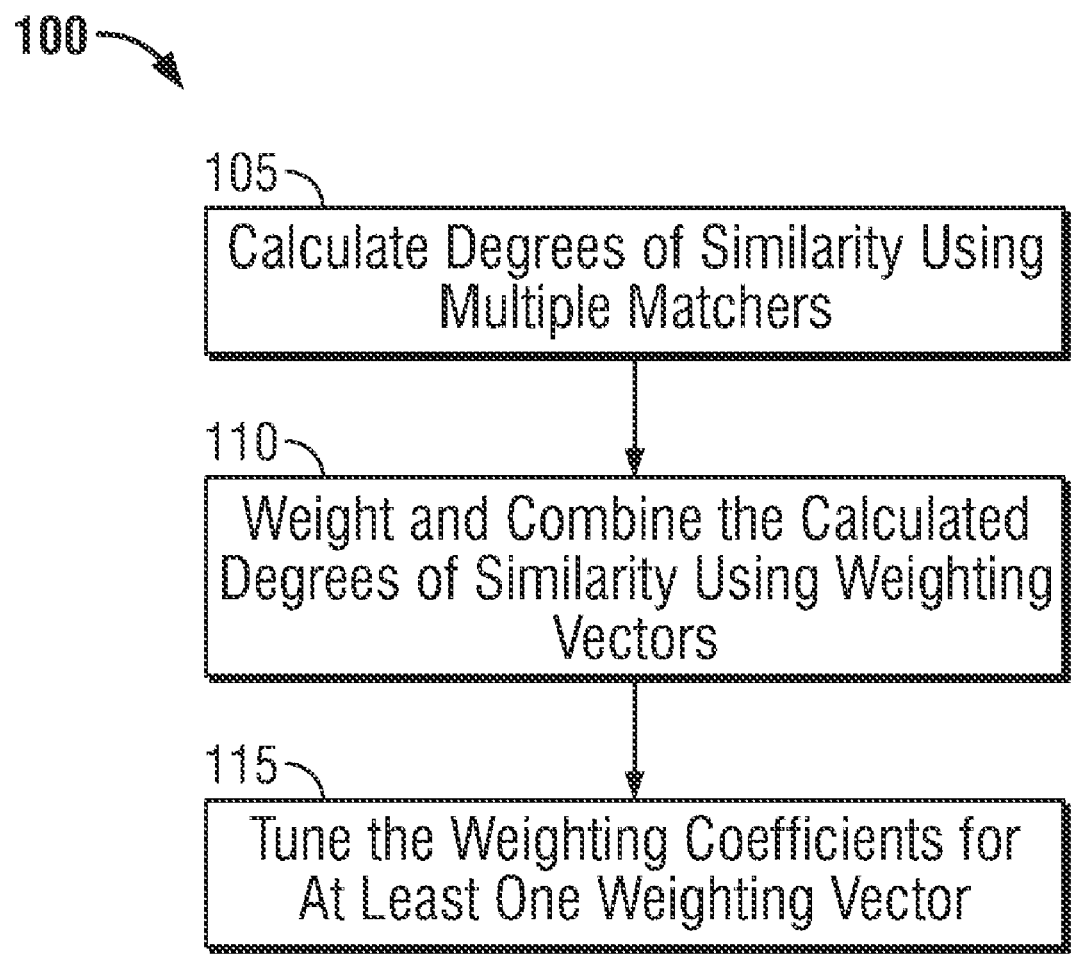
FIG. 1 is a flow diagram of a process for identifying matches between disparate schemas.

FIG. 1 is a flow diagram of a process 100 for identifying matches between disparate schemas. A degree of similarity between elements of two schemas is calculated using multiple different matching techniques (step 105). Generally, a schema can be represented graphically or by a textual description of a logical relationship among different elements of the schema. The elements of a schema can be graphs, nodes, vertices, fields, leafs, or branches (i.e., groups of nodes or vertices) of the schema.

The matching techniques can use matchers that implement particular matching processes. Any number of different types of matching processes can be used. For example, the matching processes may be implemented in individual matchers that are schema-based, content-based, type-based, or semantic-based matchers. Schema-based matchers consider schema information, while content-based matchers consider instance data within a particular schema. Schema-based matchers can include per-element matchers, which can be linguistic (e.g., using element names or descriptions) or constraint-based (e.g., using types or keys). Schema-based matchers can also include structural matchers, which match combinations of elements or nodes and may be constraint based (e.g., graph matchers). Content-based matchers can include per-element matchers, which can be linguistic (e.g., using word frequencies or key terms) or constraint-based (e.g., using value patterns and ranges). Type-based matchers can include per-element matchers, which can perform matching based on the type of node (e.g., characteristics, facets, regular expressions), and semantic matchers can analyze the semantical context of the definition and name of each node. Matching processes may also be implemented in combined matchers, which may be hybrid (e.g., using multiple match criteria) or composite (e.g., using manually or automatically determined combinations of results from different match algorithms). One or more of these various different matching techniques can be used in step 105. Other types of matchers can also be used.

Each matching technique produces results that indicate a degree of similarity between an element in a first schema and an element in a second schema. For example, for every pair of elements between the two schemas, a matching technique may assign a value between zero and one, which indicates a probability estimate that the two elements match, with a value of zero indicating an absolute impossibility and a value of one indicating an absolute certainty of a match.

The calculated degrees of similarity are then combined using one or more weighting vectors to provide composite match results (step 110). Each weighting vector includes multiple weighting coefficients, with each weighting coefficient corresponding to a particular matching process. By multiplying each degree of similarity for a specific matching process by the corresponding weighting coefficient, the degree of similarity can be weighted to provide more or less of a contribution relative to other matching processes. The weighted degree of similarity for the specific matching process is then added to the weighted degrees of similarity for the other matching processes to obtain a combined degree of similarity. Each possible pairing of elements thus has a corresponding combined degree of similarity. Depending on the type of schemas to be combined, the weighting vector will typically provide relatively more accurate or less accurate results (e.g., compared to a different weighting vector or an even weighting of all calculated degrees of similarity).

It is possible to define the weighting vector for each matching procedure. The initial weighting vector or vectors that are used may be selected based on characteristics of the schema to be matched. When schema are to be matched, parameters relating to the schema and/or the matching process can be manually input into, or automatically generated by (e.g., by performing an automated analysis of the schema's structure, type, etc.), a system that performs the matching. These parameters can be used to influence which weighting vector or vectors are initially selected. The parameters may be related to, e.g., the schema domain, a context of the schema and/or the matching process, etc. For example, a schema that is similar to a previously mapped schema (e.g., a schema that is a different version of a previously mapped dialect) is assigned a weighting vector that is the same as or otherwise corresponds to (e.g., a modified or tuned weighting vector, as described below) the weighting vector for the previously mapped schema.

Parameters that relate to the context of the schema can also affect the weighting vectors. For example, if a specific schema comes from a specific industry (e.g. automotive), the weighting vectors can be adjusted according the requirements of the specific industry. Different industries may have different specific requirements for the matching process and thus the weighting vectors may be adjusted in accordance with these requirements. Context drivers can include, for example: a business process type, a business document type, an industry category, a product category, a geopolitical area, and/or a system type. Which weighting vectors are used for particular contexts can be manually preprogrammed or can be selected based on an automated or partially automated tuning process, through which weighting vectors used in a particular context are adjusted through a "learning" process and the adjusted weighting vectors are subsequently used for matching other schema with the same context.

To improve the accuracy of the composite match results, the weighting coefficients are tuned using information relating to a predicted degree of matching accuracy associated with the one or more weighting vectors (step 115). In other words, the weight coefficients can be adjusted based on one or more predicted degrees of matching accuracy, or a specific weighting vector can be selected over other possible weighting vectors based on a comparison of predicted degrees of matching accuracy for the various possible weighting vectors. The adjustment can be performed by a user, after receiving the comparison results, or automatically by analyzing other comparison results, in which similar schema structures are mapped.

In some implementations, the predicted degree of matching accuracy is a calculation of a level of ambiguity associated with a particular weighting vector. The combined degree of similarity for a particular pair of elements (i.e., an element from a source schema and a potentially matching element from a target schema) can be used to categorize the potential match as ambiguous, unambiguous, or impossible. Thereafter, the level of ambiguity can be calculated based on a number of ambiguous matches, a number of unambiguous matches, and a number of impossible matches.

An ambiguous match generally means that a statistical possibility exists that the pair of elements actually match. In some implementations, multiple ambiguous matches can be associated with a particular element. For example, a particular source element might have several statistically possible matches in a target schema. Each of the statistically possible matches can be an ambiguous match. For purposes of this description, an unambiguous match generally means that it is at least statistically probable that the pair of elements actually matches, and an impossible match generally means that it is statistically improbable or impossible that the pair of elements actually match. For example, an unambiguous match can be defined by combined degrees of similarity for which the maximum probability of a match, among all possible matches, exceeds 70%, while an impossible match can be defined by combined degrees of similarity for which the maximum probability of a match, among all possible matches, is less than 50%.

Classifying a match as unambiguous does not necessarily mean that two identified elements actually do match, just that the particular matching process (or combination of processes) used to predict matches generates matching results that suggest a statistical probability of a match. Similarly, classifying a match as impossible does not necessarily mean that a match does not exist, just that the particular matching process (or combination of processes) used to predict matches is unable to predict a match with a sufficient degree of confidence.

Matches between two schemas can be categorized based on combined degrees of similarity in both directions or in only one direction (i.e., from a source to a target schema). For example, if matching is performed in both directions, a particular pair of elements may be identified as unambiguous only if the pair of elements meet the criteria for an unambiguous match in both directions (e.g., target element t and source element s represent an unambiguous match only if the corresponding probability of a match: (a) exceeds 70%, (b) is the maximum probability associated with target element t for all possible source elements, and (c) is the maximum probability associated with source element s for all possible target elements). If matching is performed in a single direction, on the other hand, the particular pair of elements may be identified as unambiguous if the pair of elements meet the criteria for an unambiguous match in only one direction (e.g., target element t and source element s represent an unambiguous match if the corresponding probability of a match exceeds 70% and is the maximum probability associated with target element t for all possible source elements, but is not necessarily the maximum probability associated with source element s for all possible target elements).

Once a categorization is made among the different levels of ambiguity, a calculation of the overall level of ambiguity for a particular weighting vector can be made. For example, an overall level of ambiguity a can be calculated by:

$$a=(U+A+I)/N,$$

where U is the number of unambiguous matches, A is the number of ambiguous matches including all proposed matches (e.g., if one node of a source schema is ambiguously assigned to five potential target nodes, there are five ambiguous matches), I is the number of impossible matches, and N is the total number of nodes or elements and is used for normalizing the value of the overall level of ambiguity a. The values of U, A, I, and N can correspond to the number of target elements, source elements, or total elements that fit into each category. Generally, the values of U, A, I, and N should be expressed in the same units (e.g., if U is the number of target elements that are classified as unambiguous, then A, I, and N should be expressed as a number of target elements, rather than a number of source elements or total elements).

The value of a for the particular weighting vector can then be compared to the value of a for other predefined weighting vectors to find the lowest overall level of ambiguity a. Alternatively, the weighting coefficients can be adjusted using an adjustment algorithm to optimize or improve (e.g., reduce) the overall level of ambiguity a. Thus, the calculated overall level of ambiguity can serve as a measure of a predicted degree of matching accuracy for weighting vectors.

Other algorithms for calculating the overall level of ambiguity for weighting vectors can also be used. In the above example, the goal may be to reduce the overall level of ambiguity a as much as possible, thereby favoring weighting vectors that minimize the number of ambiguous matches. In other implementations, it may be desirable to reduce (or increase) the number of impossible assignments, to reduce (or increase) the number of unambiguous matches, or to perform some combination of these alternatives (e.g. to reduce the number of unambiguous matches while increasing (or maximizing) the number of ambiguous matches.

Which type of weighting vector tends to be favored and how the level of ambiguity is calculated generally depends on the desired results. Typically, implementations of a matching process, such as process 100, act as a tool for performing a semi-automated mapping of elements between two or more schemas. The tool produces proposed mappings that are reviewed by a user to approve or reject each individual mapping and/or to identify mappings that may not have been proposed by the tool. Accordingly, the tool can present the proposed mappings to the user on a user interface that distinguishes between mappings that are unambiguous, ambiguous, or impossible. For example, unambiguous results can be color-coded in green, ambiguous matches in yellow, and impossible matches in red. A user can use this information to assume that unambiguous matches are correct, to assume that impossible matches can be ignored, and to devote their primary attention to reviewing ambiguous matches to identify which ones are correct. In some cases, the tool may be used to reduce the workload of the user by reducing the number of ambiguous matches. In other cases, the tool may be used to reduce the number of unambiguous matches to prevent the possibility that the user will incorrectly assume that the tool made a correct mapping.

Furthermore, the tool may be used for different purposes at different stages of a mapping procedure. For example, the tool may be initially used to minimize the number of ambiguous matches. Subsequently, after the user has approved some of the proposed matches, settings for the tool can be changed to favor minimizing the number of unambiguous matches. In addition to favoring different levels of ambiguity using different weighting vectors, the results of the composite matcher can also be influenced by adjusting threshold levels or other criteria for determining whether pairs of elements represent unambiguous, ambiguous, or impossible matches.

The categorization among ambiguous, unambiguous, and impossible matches is arbitrary in that the categories can be defined differently for different implementations (e.g., what constitutes an unambiguous match can differ between different implementations or even in the same implementation depending on other characteristics of the element). The criteria used to categorize a particular combined degree of similarity as ambiguous, unambiguous, or impossible can be selected by a developer (e.g., programmer) of software that implements the process 100 or can be set by a user of such software. As can be seen from the example above, unambiguous matches and impossible matches do not necessarily require a probabilistic certainty. A fewer or greater number of levels can also be defined. For example, some implementations may use only the ambiguous and impossible match categorizations, while other implementations may categorize the combined degrees of similarity into a greater number of different levels of ambiguity (e.g., unambiguous, mildly ambiguous, moderately ambiguous, highly ambiguous, and impossible). Other techniques for determining a level of ambiguity associated with a particular weighting vector can also be used (e.g., using an algorithm that performs computations using some or all of the combined degrees of similarity).

In other implementations, instead of defining the predicted degree of matching accuracy as a calculation of a level of ambiguity associated with a particular weighting vector, the predicted degree of matching accuracy can be based on feedback from a user. For example, the combined degrees of similarity generally provide composite match results that indicate which pairs of elements between the source and target schemas are likely and/or unlikely to represent actual matches. A user can review a subset (e.g., ten possible matches or 5% of the possible matches) of the total set of possible matches and provide feedback regarding whether the possible matches in the subset represent actual matches. This feedback can be used to modify the weighting vector. For instance, the correct matches identified by the user can be compared with results of the various matching processes to determine correlations (i.e., which matching processes were most likely to predict the correct match). The weighting vector can then be adjusted to more heavily weight the matching processes that showed the greatest correlations. The adjusted weighting vector can then be used to generate new combined degrees of similarity. Thus, the user feedback on a subset of the possible matches provides a measure of a predicted degree of matching accuracy for weighting vectors. The use of user feedback to adjust the weighting vector can be applied iteratively, such that the matching process continuously "learns" how to better predict matches between the particular schemas being mapped. The settings of the weighting vectors is changed according to feedback from the user. The user can influence the different weighting vectors of each matching type. For example, if the user defines that the matching result of name or definition is primarily wrong, then the weighting vector of a semantic or name matcher will be changed.

User feedback can also be used to fine-tune a weighting vector that is selected from one or more candidate weighting vectors using a calculated level of ambiguity. For example, by identifying a particular weighting vector having a lowest calculated level of ambiguity among a set of predefined weighting vectors, the particular weighting vector can be selected as a "best" candidate for producing matching proposals. The particular weighting vector can then be fine-tuned by adjusting the weighting coefficients based on feedback from a user.

In general, the performance of a particular matching process can be assessed based on certain metrics. The precision of the matching process is a measure of the reliability of the proposed matches and can be calculated as the number of correct matches divided by the total number of proposed matches. The recall of the matching process indicates the percentage of correct matches found and can be calculated as the number of correct matches divided by the number of actual matches. Neither precision nor recall alone, however, provides a good assessment of performance. Generally, high precision can be obtained at the expense of recall, and vice versa. Performance can more accurately be assessed by an overall measurement, which is calculated as:

Overall=Recall*(2−1/Precision).

The recall, precision, and overall measurements can only be calculated once all correct matches are known. Thus, these metrics do not generally provide an estimate of performance for a generic matching process. The process 100, however, can be used to predict whether a particular weighting vector will produce results with a favorable overall measurement and, thus, can be used to improve performance.

Figure 2:
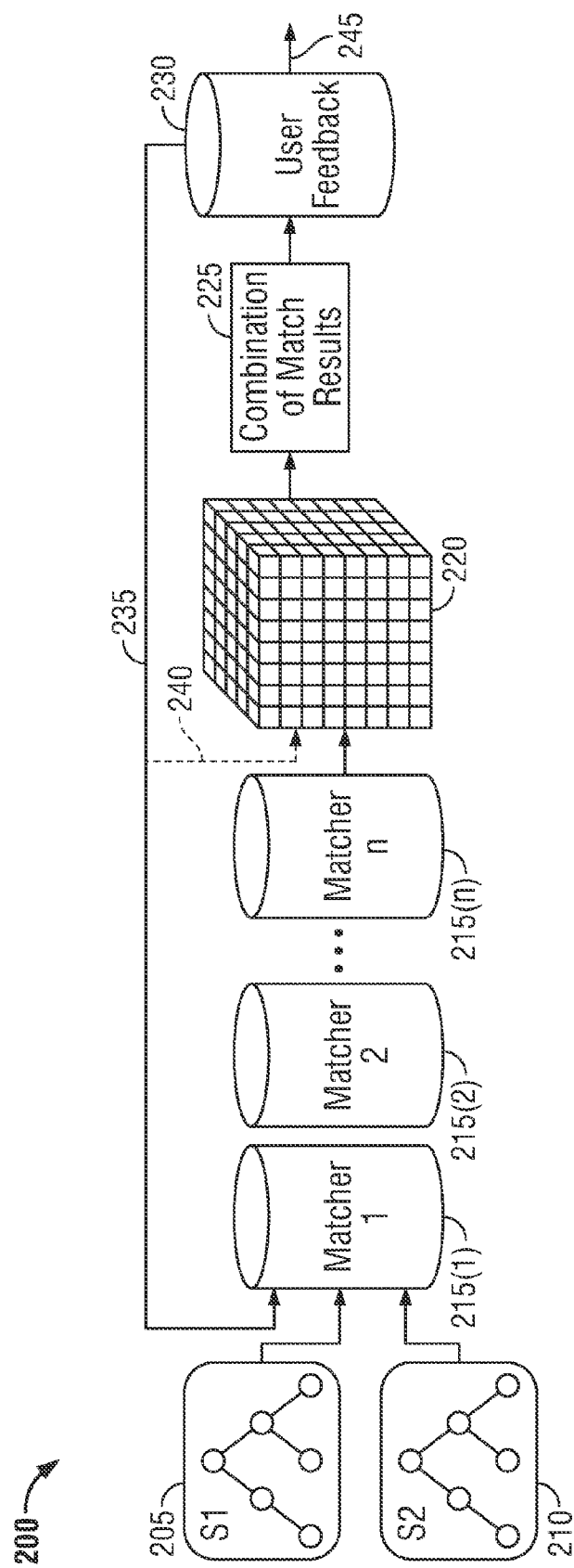
FIG. 2 is a block diagram of a system for identifying matches between disparate schemas.

FIG. 2 is a block diagram of a system 200 for identifying matches between disparate schemas. A source schema 205 and a target schema 210 represent schemas to be mapped to one another (or from one to the other). Multiple different matchers 215(1), 215(2), . . . 215(n) are used to calculate degrees of similarity between elements of the two schemas 205 and 210. The calculated degrees of similarity are stored in a similarity cube 220, which can be maintained in a buffer or a memory. The similarity cube 220 includes a storage location for each combination of a matcher 215, a source schema 205 element, and a target schema 210 element. For example, the similarity cube 220 can include storage locations that, conceptually, have x, y, and z coordinates.

Figure 3:
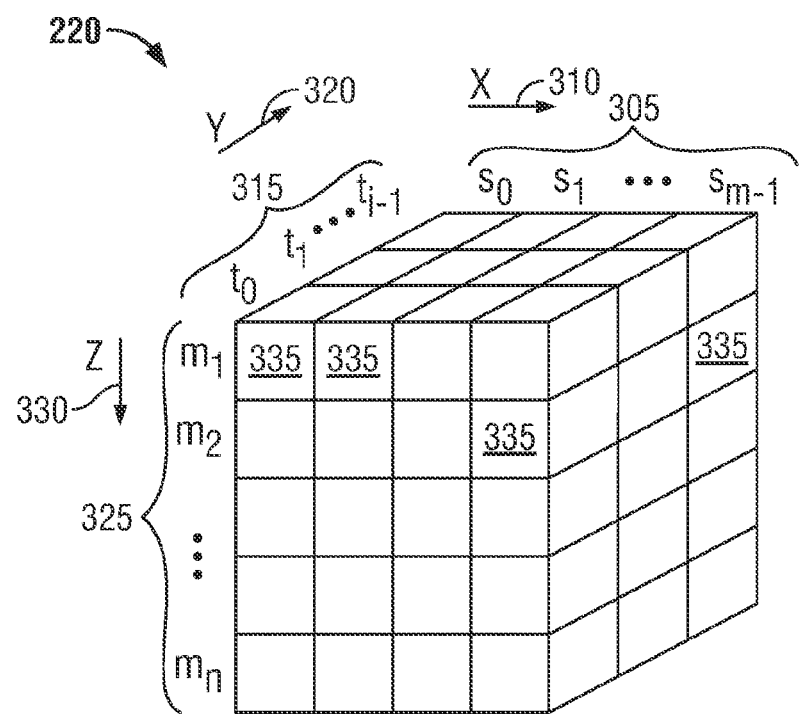
FIG. 3 is an illustrative example of a similarity cube that can be used in the system of FIG. 2.

FIG. 3 illustrates an example of a similarity cube 220. Each row 305 in the x direction 310 represents a different source schema 205 element ($s_0, s_1, \ldots s_{m-1}$, where m is the number of elements in the source schema 205), and each column 315 in the y direction 320 represents a different target schema 210 element ($t_0, t_1, \ldots t_{i-1}$, where i is the number of elements in the target schema 210, with m=i, m>i, or m<i). Each level 325 in the z direction 330 represents a different matcher 215 (e.g., matcher 215(1), matcher 215(2), . . . matcher 215(n)). A degree of similarity can be calculated for each source schema element—target schema element pair, as analyzed by each different matcher 215, and the degree of similarity can be stored in a storage location 335 corresponding to the source schema element, the target schema element, and the matcher 215.

In some implementations, however, it may be unnecessary to calculate a degree of similarity for every source schema element-target schema element pair because some pairs (or entire branches of a schema) may be easily rejected without having to calculate a degree of similarity. For example, a branch of the source schema 205 might include elements that exclusively store text data. The possibility that such a branch matches a branch of the target schema 210 having elements that exclusively store floating-point numbers can be easily rejected. As a result, degrees of similarity do not need to be calculated for elements in these branches, and the similarity cube may include empty storage locations. Which element pairs can be omitted from the degree of similarity calculation can be determined on a matcher-by-matcher basis (e.g., one matcher calculates a degree of similarity while another does not) or for all matchers 215 (e.g., a particular element pair is omitted from the degree of similarity calculation for all matchers 215).

As shown in FIG. 2, the calculated degrees of similarity from the similarity cube 220 are combined by a match results combiner 225 in accordance with one or more weighting vectors. For example, the calculated degrees of similarity from each matcher 215 are weighted by a weighting coefficient corresponding to the matcher 215, and the weighted degrees of similarity for each element pair are added together. Each weighting coefficient represents a level of importance for the calculated degree of similarity relative to the calculations from other matchers. Typically, for a given weighting vector, all of the calculated degrees of similarity for a particular matcher are given the same weight. Accordingly, the weighting vector is used to attribute greater importance to some matchers relative to others. Ontology information (e.g., information about a classification of each schema) can also be used, if available, to obtain match results. The combined degrees of similarity are used to identify which element pairs are likely to match, might match, or are unlikely to match. The likely or possible matches can be used to generate at least a partial mapping of elements between schemas (e.g., from the source schema 205 to the target schema 210, from the target schema 210 to the source schema 205, or both).

Which element pairs are identified as likely or possible matches depends on a type of selection algorithm used. A "threshold" selection algorithm identifies all element pairs with a combined degree of similarity over a certain threshold. A "MaxN" type of selection algorithm identifies the n largest combined degrees of similarity, where n is an integer greater than or equal to one, and a "Max Delta" type of selection algorithm identifies: (a) the element pair with the largest combined degree of similarity, and (b) all element pairs having a combined degree of similarity within some delta value of the largest value. These selection algorithms can be combined and/or other selection algorithms can be used.

Depending on the particular implementation, a set of combined degrees of similarity for a specific weighting vector can be used as an initial estimation for predicting matches or can simply be compared to combined degrees of similarity for other weighting vectors to narrow the selection of weighting vectors. In either case, the weighting coefficients are tuned to obtain an improved mapping of the schemas and/or to improve the identification of likely or probable matches.

Figure 4:
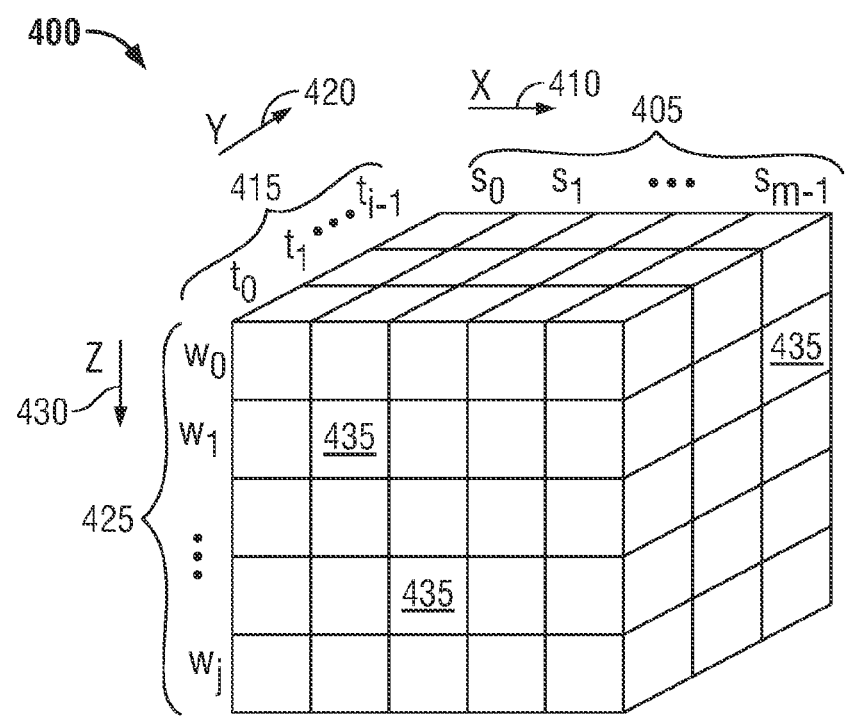
FIG. 4 is an illustrative example of a weighting vector similarity cube.

When multiple weighting vectors are applied to the similarity cube 220, the result is essentially a new similarity cube in which each level in the z-direction corresponds to results from a particular weighting vector instead of from a particular matcher 215. FIG. 4 illustrates an example of a weighting vector similarity cube 400. As with the original similarity cube 220, each row 405 in the x direction 410 represents a different source schema 205 element, and each column 415 in the y direction 420 represents a different target schema 210 element. However, each level 425 in the z direction 430 represents a different weighting vector ($w_0, w_1, \ldots w_j$). Thus, each storage location 435 in the weighting vector similarity cube 400 contains a combination of the degrees of similarity for the corresponding source schema element and target schema element across all of the matchers 215 (e.g., a weighted combination of the storage locations 335 in the z-direction 330 from FIG. 3).

Each level of the weighting vector similarity cube 400 can be compared to the other levels to identify one or more weighting vectors that provide the most desirable results according to a measure of ambiguity in the results. The measure of ambiguity that is most desirable and how the measure of ambiguity is defined can be selected by a user of the system 200 or can be predefined in the system 200. For example, in one possible implementation, a weighting vector that provides a minimum number of ambiguous matchers and minimum number of impossible matches relative to other weighting vectors may be selected as the most desirable. By comparing the results of multiple weighting vectors, the weighting vector with weighting coefficients that produce the most desirable results can be selected, thereby performing a tuning operation. Thus, tuning is performed by selecting a particular weighting vector among a limited set of weighting vectors defined prior to performing the tuning operation.

In some implementations, tuning (or fine-tuning) is performed by generating new weighting coefficients (e.g., identifying one or more additional candidate weighting vectors) after making an initial selection of a weighting vector. For example, when only one weighting vector is initially used to calculate combined degrees of similarity, the weighting coefficients for the weighting vector can be modified or tuned after obtaining the initial results. As shown in FIG. 2, tuning can be performed based on user feedback (as received at 230) and/or based on one or more calculated levels of ambiguity. For example, the results associated with several weighting vectors may tend to indicate trends in how weighting coefficients affect levels of ambiguity. By analyzing such trends, fine-tuning of a weighting vector can be performed.

In some implementations, optional user feedback (as indicated at 230) involves approving or rejecting matches proposed by the match results combiner 225. The user feedback can be used to generate a final mapping 245 of elements between the source schema 205 and the target schema 210. In addition or as an alternative, the user feedback can be used to fine-tune the mapping results. In the latter situation, additional match iterations (as indicated at 235) are performed. Subsequent match iterations may involve re-executing at least some of the matchers 215, such as when some of the matchers 215 themselves are hybrid matchers that take into account user feedback. In other cases, however, and for some matchers 215, subsequent match iterations do not impact the results produced by the matchers 215 or the corresponding degree of similarity information stored in the similarity cube 220 and, thus, do not involve any re-execution of the matchers 215. Such match iterations, instead, can involve merely looping back to the match results combiner 225 (as indicated at 240). In subsequent match iterations, the weight vectors applied in the match results combiner 225 can be adjusted in an attempt to produce more desirable matching results (e.g., a lower measure of ambiguity, results that have a higher percentage of correct matches, results that have a lower percentage of incorrect matches, results that identify a correct match as one of the possible matches, etc.). What defines desirable matching results can depend on the particular environment in which the system is used, the types of schemas on which the system operates, user-selected settings, and/or settings that are pre-defined in the system 200.

Figure 5:
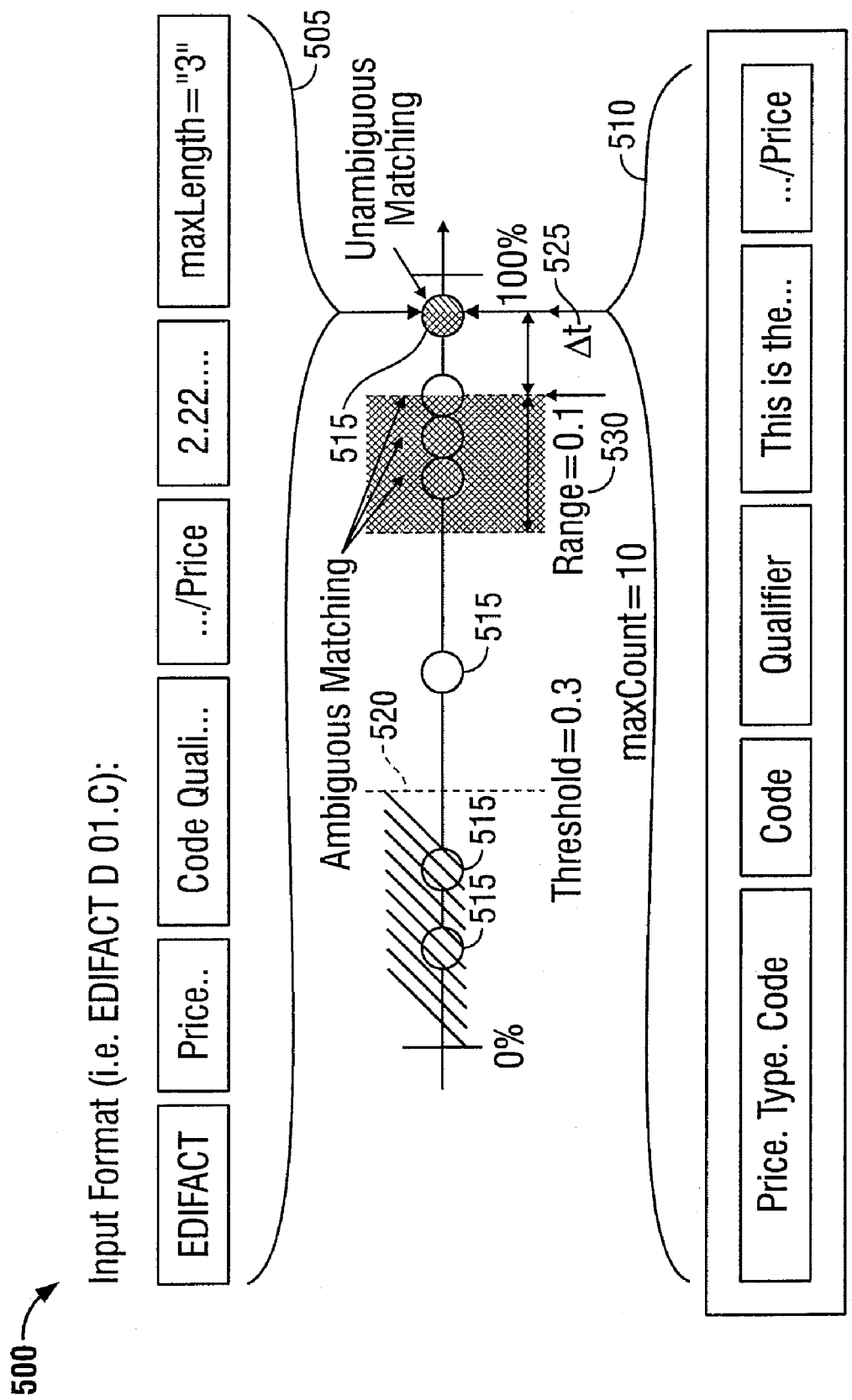
FIG. 5 is an illustrative diagram of a technique for categorizing match results into different levels of ambiguity.

FIG. 5 is an illustrative diagram of a technique 500 for categorizing match results into different levels of ambiguity. A calculation of a degree of similarity between each pair of elements in a source schema 505 and a target schema 510 results in a factor between zero and one hundred percent, with the factor reflecting a percent likelihood that the element pair matches, as determined by the particular matching process used. Typically, the categorization technique 500 is used for matching processes that involve a weighted combination of other matching processes, but the categorization technique 500 can be applied to any type of matching process. Although the categorization technique 500 is discussed below in the direction of finding elements in the target schema 510 that match elements in the source schema 505, the technique can alternatively or additionally be used for categorizing matches in the opposite direction.

In the illustrated example of FIG. 5, each source schema 505 element for which the maximum calculated degree of similarity 515 among all possible matches for the source schema 505 element is less than a first threshold value 520 equal to 0.3 (i.e., thirty percent) is considered to be an impossible match. In other words, it is impossible for the matching process to predict a match involving the source schema 505 element. Each source schema 505 element for which the maximum calculated degree of similarity among all possible matches for the source schema 505 element is greater than the first threshold value (or a larger, second threshold value) and is greater than the next largest calculated degree of similarity for the source schema 505 element by at least a value $\Delta t$ 525 is considered to be an unambiguous match. Finally, each source schema 505 element for which at least two calculated degrees of similarity are greater than the first threshold value and are within a range value 530 equal to 0.1 (i.e., a ten percent interval) of the maximum calculated degree of similarity for the source schema 505 element is considered to be an ambiguous match.

The number of ambiguous, impossible, and/or unambiguous matches can be used to calculate a measure of ambiguity. The measure of ambiguity can, in turn, be used to compare the weighting vector used to generate the matching results with other weighting vectors or to otherwise tune the weighting vector (e.g., by comparing the measure of ambiguity with corresponding measures for similar weighting vectors in which the weighting coefficients have been adjusted).

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. Other embodiments are within the scope of the following claims

What is claimed is:

1. A computer program product tangibly embodied in a non-transitory machine-readable storage device that stores instructions for causing data processing apparatus to perform operations for facilitating automated identification of matches between elements of disparate schemas, the operations comprising:
    calculating a first degree of similarity between elements of a first schema and elements of a second schema using a first matching process;
    calculating a second degree of similarity between the elements of the first schema and the elements of a second schema using a second matching process;
    combining the first degree of similarity and the second degree of similarity using a first weighting vector to provide a combined degree of similarity, the first weighting vector comprising a first weighting coefficient corresponding to the first matching process and a second weighting coefficient corresponding to the second matching process;
    determining a level of ambiguity based on the first combined degree of similarity, the level of ambiguity accounting for at least one of a number of unambiguous matches between elements of the first and second schemas, a number of ambiguous matches between elements of the first and second schemas and a number of impossible matches between elements of the first and second schemas; and
    adjusting the first weighting coefficient and the second weighting coefficient based on the level of ambiguity to provide a second weighting vector by receiving user feedback relating to a subset of possible matches between the elements of the first schema and the elements of the second schema, the first coefficient and the second coefficient being adjusted based on the user feedback.

2. The computer program product of claim 1, wherein determining a level of ambiguity comprises:
    determining the number of unambiguous matches between elements of the first and second schemas;
    determining the number of ambiguous matches between elements of the first and second schemas;
    determining the number of impossible matches between elements of the first and second schemas; and
    calculating the level of ambiguity based on the number of unambiguous matches, the number of ambiguous matches, and the number of impossible matches.

3. The computer program product of claim 2, wherein an unambiguous match includes a match that is statistically probable, and an impossible match includes a match that is statistically impossible.

4. The computer program product of claim 1, wherein the level of ambiguity is normalized based on a total number of elements of the first and second schemas.

5. The computer program product of claim 1, wherein the first matching process is executed using a first matcher comprising one of a schema-based matcher, a content-based matcher, a type-based matcher and a semantic-based matcher, and the second matching process is executed using a second matcher that is different from the first matcher and that comprises one of a schema-based matcher, a content-based matcher, a type-based matcher and a semantic-based matcher.

6. The computer program product of claim 1, wherein the first degree of similarity and the second degree of similarity are combined by multiplying the first degree of similarity by the first weighting coefficient and by multiplying the second degree of similarity by the second weighting coefficient to obtain respective weighted degrees of similarity, and summing the weighted degrees of similarity.

7. A computer-implemented method for identifying matches between disparate schemas, the method comprising:
    calculating, using a data processing apparatus, a first degree of similarity between elements of a first schema and elements of a second schema using a first matching process, each of the first and second schemas comprising data elements stored in a computer-readable storage medium;
    calculating, using the data processing apparatus, a second degree of similarity between the elements of the first schema and the elements of a second schema using a second matching process;
    combining, using the data processing apparatus, the first degree of similarity and the second degree of similarity using a first weighting vector to provide a combined degree of similarity, the first weighting vector comprising a first weighting coefficient corresponding to the first matching process and a second weighting coefficient corresponding to the second matching process;

determining, using a data processing apparatus, a level of ambiguity based on the first combined degree of similarity, the level of ambiguity accounting for at least one of a number of unambiguous matches between elements of the first and second schemas, a number of ambiguous matches between elements of the first and second schemas and a number of impossible matches between elements of the first and second schemas; and adjusting, using a data processing apparatus, the first weighting coefficient and the second weighting coefficient based on the level of ambiguity to provide a second weighting vector by receiving user feedback relating to a subset of possible matches between the elements of the first schema and the elements of the second schema, the first coefficient and the second coefficient being adjusted based on the user feedback.

8. The method of claim 7, wherein determining a level of ambiguity comprises:
determining the number of unambiguous matches between elements of the first and second schemas;
determining the number of ambiguous matches between elements of the first and second schemas;
determining the number of impossible matches between elements of the first and second schemas; and
calculating the level of ambiguity based on the number of unambiguous matches, the number of ambiguous matches, and the number of impossible matches.

9. The method of claim 8, wherein an unambiguous match includes a match that is statistically probable, and an impossible match includes a match that is statistically impossible.

10. The method of claim 7, further comprising normalizing the level of ambiguity based on a total number of elements of the first and second schemas.

11. The method of claim 7, wherein the first matching process is executed using a first matcher comprising one of a schema-based matcher, a content-based matcher, a type-based matcher and a semantic-based matcher, and the second matching process is different than the first matching process and is executed using a second matcher comprising one of a schema-based matcher, a content-based matcher, a type-based matcher and a semantic-based matcher.

12. The method of claim 7, wherein the first degree of similarity and the second degree of similarity are combined by multiplying the first degree of similarity by the first weighting coefficient and by multiplying the second degree of similarity by the second weighting coefficient to obtain respective weighted degrees of similarity, and summing the weighted degrees of similarity.

13. A system for identifying matches between disparate schemas, the system comprising:
one or more data processing apparatus;
a computer-readable storage device that stores instructions for causing the data processing apparatus to perform operations for facilitating automated identification of matches between elements of disparate schemas, the operations comprising:

calculating a first degree of similarity between elements of a first schema and elements of a second schema using a first matching process;

calculating a second degree of similarity between the elements of the first schema and the elements of a second schema using a second matching process;

combining the first degree of similarity and the second degree of similarity using a first weighting vector to provide a combined degree of similarity, the first weighting vector comprising a first weighting coefficient corresponding to the first matching process and a second weighting coefficient corresponding to the second matching process;

determining a level of ambiguity based on the first combined degree of similarity, the level of ambiguity accounting for at least one of a number of unambiguous matches between elements of the first and second schemas, a number of ambiguous matches between elements of the first and second schemas and a number of impossible matches between elements of the first and second schemas; and adjusting the first weighting coefficient and the second weighting coefficient based on the level of ambiguity to provide a second weighting vector by receiving user feedback relating to a subset of possible matches between the elements of the first schema and the elements of the second schema, the first coefficient and the second coefficient being adjusted based on the user feedback.

14. The system of claim 13, wherein determining a level of ambiguity comprises:
determining the number of unambiguous matches between elements of the first and second schemas;
determining the number of ambiguous matches between elements of the first and second schemas;
determining the number of impossible matches between elements of the first and second schemas; and
calculating the level of ambiguity based on the number of unambiguous matches, the number of ambiguous matches, and the number of impossible matches.

15. The system of claim 14, wherein an unambiguous match includes a match that is statistically probable, and an impossible match includes a match that is statistically impossible.

16. The system of claim 13, wherein the level of ambiguity is normalized based on a total number of elements of the first and second schemas.

17. The system of claim 13, wherein the first matching process is executed using a first matcher comprising one of a schema-based matcher, a content-based matcher, a type-based matcher and a semantic-based matcher, and the second matching process is executed using a second matcher that is different from the first matcher and that comprises one of a schema-based matcher, a content-based matcher, a type-based matcher and a semantic-based matcher.

18. The system of claim 13, wherein the first degree of similarity and the second degree of similarity are combined by multiplying the first degree of similarity by the first weighting coefficient and by multiplying the second degree of similarity by the second weighting coefficient to obtain respective weighted degrees of similarity, and summing the weighted degrees of similarity.

* * * * *